US007119463B2

(12) United States Patent
Chen et al.

(10) Patent No.: US 7,119,463 B2

(45) Date of Patent: Oct. 10, 2006

(54) VIBRATION MOTOR BOOT

(75) Inventors: Chao Chen, Waterloo (CA); Robert Pillips, Waterloo (CA)

(73) Assignee: Research in Motion Limited, Waterloo (CA)

( * ) Notice: Subject to any disclaimer, the term of this patent is extended or adjusted under 35 U.S.C. 154(b) by 0 days.

(21) Appl. No.: 10/631,111

(22) Filed: Jul. 31, 2003

(65) Prior Publication Data

US 2005/0023427 A1 Feb. 3, 2005

(51) Int. Cl.
*H02K 7/06* (2006.01)

(52) U.S. Cl. ............................ 310/81; 310/91; 310/51; 361/801; 439/500; 439/701; 439/91; 340/319

(58) Field of Classification Search ........... 248/346.03; 310/81, 91, 51; 439/500, 701, 91; 340/319; 361/801
See application file for complete search history.

(56) References Cited

U.S. PATENT DOCUMENTS

| | | | | |
|---|---|---|---|---|
| 5,707,249 | A * | 1/1998 | Byrd | 439/500 |
| 5,769,382 | A * | 6/1998 | Kobayashi et al. | 248/638 |
| 5,801,466 | A * | 9/1998 | Odagiri et al. | 310/81 |
| 5,898,248 | A * | 4/1999 | Ikeda et al. | 310/91 |
| 5,943,214 | A * | 8/1999 | Sato et al. | 361/752 |
| 6,133,657 | A * | 10/2000 | Semenik et al. | 310/81 |
| 6,227,901 | B1 * | 5/2001 | Pupkiewicz et al. | 439/500 |
| 6,347,945 | B1 * | 2/2002 | Kakela et al. | 439/66 |
| 6,542,381 | B1 * | 4/2003 | Sei et al. | 361/801 |
| 6,714,123 | B1 * | 3/2004 | Miyake et al. | 340/407.1 |
| 6,783,423 | B1 * | 8/2004 | Kaneko et al. | 446/269 |
| 6,790,545 | B1 * | 9/2004 | Wu | 429/1 |
| 6,796,811 | B1 * | 9/2004 | Pupkiewicz et al. | 439/86 |
| 6,872,104 | B1 * | 3/2005 | Sun | 439/862 |

FOREIGN PATENT DOCUMENTS

| | | |
|---|---|---|
| EP | 0 971 474 A1 | 1/2000 |
| GB | 2 292 202 A | 2/1996 |
| JP | 2002345196 | 11/2002 |

* cited by examiner

*Primary Examiner*—Kimberly Wood
(74) *Attorney, Agent, or Firm*—Jeffrey W. Wong; Borden Ladner Gervais LLP

(57) ABSTRACT

A boot for a vibration motor of a mobile communication device is provided. The motor has a generally flat upper surface and is adapted to be installed in a mounting slot in a mobile communication device frame with the upper surface substantially parallel to an adjacent surface of said frame, and the mounting slot is at an angle with respect to a normal of the adjacent surface. The boot has an outer surface corresponding to the shape and angle of said mounting slot, an exposed surface generally parallel to said adjacent surface, and a motor-receiving slot for receiving said vibration motor, the motor-receiving slot having an axis angled from an axis of the mounting slot and generally normal with respect to the adjacent surface.

4 Claims, 5 Drawing Sheets

VIBRATION MOTOR BOOT

FIELD OF THE INVENTION

The present invention relates generally to mobile communication devices. More particularly, the present invention relates to a vibration motor boot for a mobile communication device.

BACKGROUND OF THE INVENTION

In recent years, mobile communication devices have become a popular communication tool. For example, providing businesspeople the capability to transmit and receive messages when they are not in the office has been very advantageous in allowing them to communicate with others on a more immediate basis. Moreover, such devices are also often used as organizers, a notebooks, and even an address books.

Some mobile communication devices play a tune in order to indicate to a user that a new message has been received. However, when a user is in a meeting or in a quiet location where silence is requested or required, an indicator lamp, located on the mobile communication device, may be turned on to indicate a new message has been received. Other than new messages, alerts for situations such as a phone call, an appointment reminder or a task reminder may be required.

Another method of alerting the user in these situations where silence is requested or required is via a vibration motor. When a new message is received, a vibration motor located within the mobile communication device causes the device to vibrate in order to alert to the user that a new message has been received.

In known mobile communication devices, the vibration motor is housed within a frame or a housing of the mobile communication device. In order to prevent the metal of the vibration motor from directly contacting the frame or housing, the vibration motor is placed into a vibration motor boot prior to being installed in the frame.

However, there are disadvantages with the tooling required to manufacture the location where the vibration motor boot and vibration motor rest within the frame or housing for known devices. In general, the frame or housing is manufactured using a mould comprising a core and cavity. In one known tooling method, the core is comprised of two separate pieces which fit within the cavity. The presence of two separate core pieces causes more time to be spent on removing the core and the cavity from the finished frame or housing. In another known method, the injection mould comprises a single piece core and a single piece cavity. However, due to the angle of known vibration boots, there exists a gap at a bottom edge of the location within which the vibration motor boot rests. Since the vibration motor boot is manufactured from a flexible material such as silicone rubber, during installation, the boot is generally compressed within the gap which affects operation of the vibration motor. Furthermore, there is no support for the vibration motor and the vibration motor boot once it has been installed.

SUMMARY OF THE INVENTION

According to a first aspect of the present invention a boot for a vibration motor of a mobile communication device is provided. The motor has a generally flat upper surface and is adapted to be installed in a mounting slot in a mobile electronic device frame with said generally flat upper surface substantially parallel to an adjacent surface of said frame, and the mounting slot is angled from a normal of said adjacent surface. The boot comprises an outer surface corresponding to the shape and angle of said mounting slot, an exposed surface generally parallel to said adjacent surface, and a motor-receiving slot for receiving said vibration motor, said motor-receiving slot having an axis angled from an axis of said mounting slot and substantially normal with respect to said adjacent surface.

In accordance with another aspect of the present invention, there is provided a frame and vibration motor mounting assembly for a mobile communication device, comprising a frame disposed generally parallel to a reference plane, a mounting slot in a motor installation surface of said frame, said motor installation surface being angled away from said reference plane, said mounting slot being normal to said reference plane and accordingly angled with respect to said motor installation surface, and a boot positionable in said mounting slot, having an exposed surface generally parallel to said motor installation surface, and having a motor-receiving slot for receiving a vibration motor, said motor receiving slot having an axis angled from an axis of said mounting slot and generally normal with respect to said motor installation surface, whereby said vibration motor is configured to be installed in said motor-receiving slot with an upper surface thereof generally parallel to said motor installation surface.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
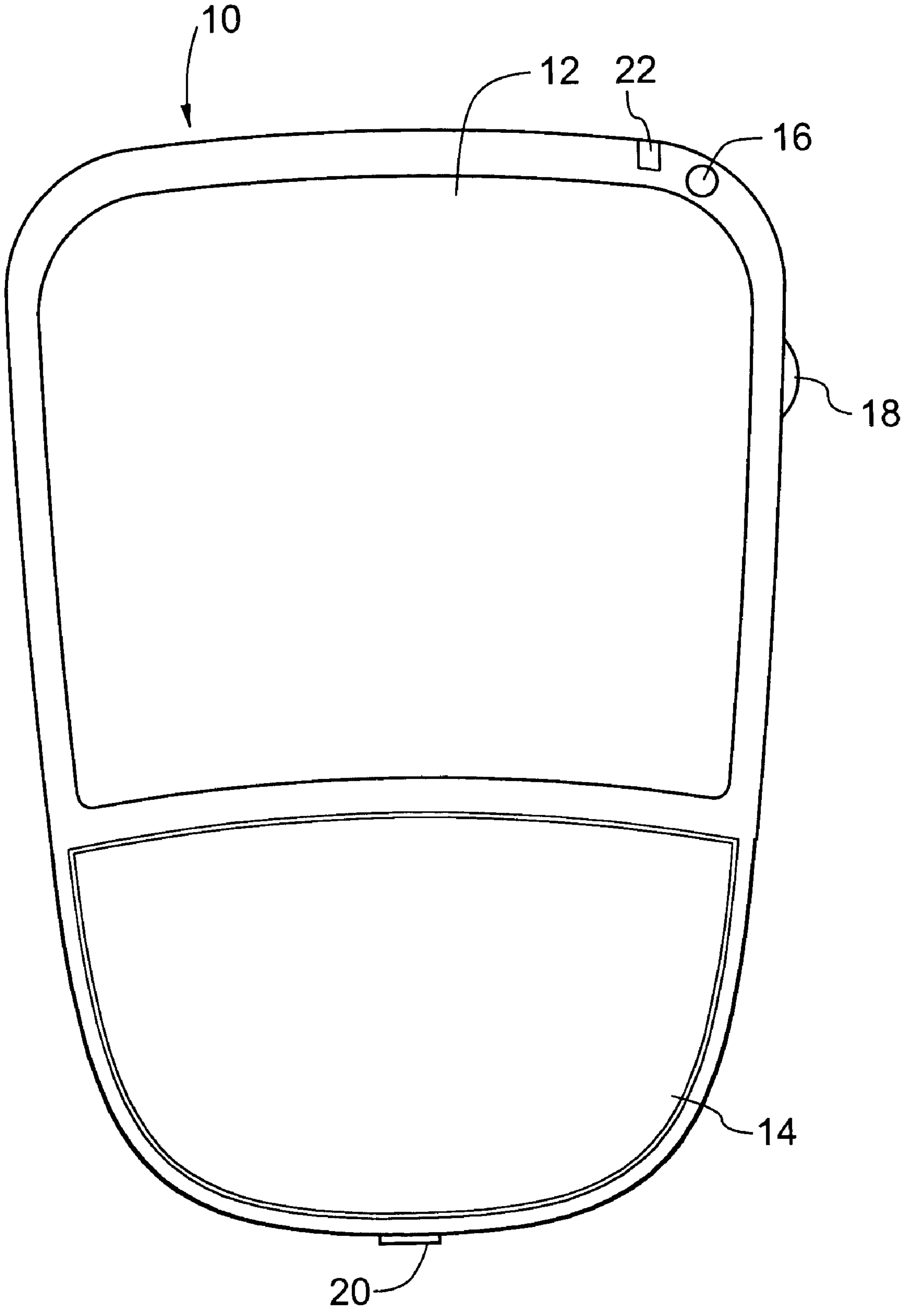
FIG. 1 is a schematic diagram of a mobile communication device.

In FIG. 1, a mobile communication device is shown. The mobile communication device 10 comprises a display 12, a keypad 14, a power button 16, a cancel button 18 and a communication port 20. The functionality of these parts will be well known to one skilled in the art. The electronic device 10 further comprises an indicator lamp 22 which preferably turns on when a new message is received by the device 10. In this manner, the user may be silently notified of new messages if the user is in a meeting or the like where silence is requested or required. However, if the mobile communication device 10 is not visible to the user, then the user might not realize that a new message has been received. Alternatively, the user may be notified of new messages by a vibration of the mobile communication device 10. This is generally achieved via an internal vibration motor (not shown). The vibration motor is typically housed in a vibration motor boot which is preferably manufactured out of a flexible material such as silicone rubber to prevent the metal of the vibration motor from directly contacting the mobile communication device frame or housing when in use. Furthermore, if the vibration boot is not present, direct contact between the vibration motor and the frame during vibration may be noisy, which detracts from the provision of a quiet alert.

Figure 2A:
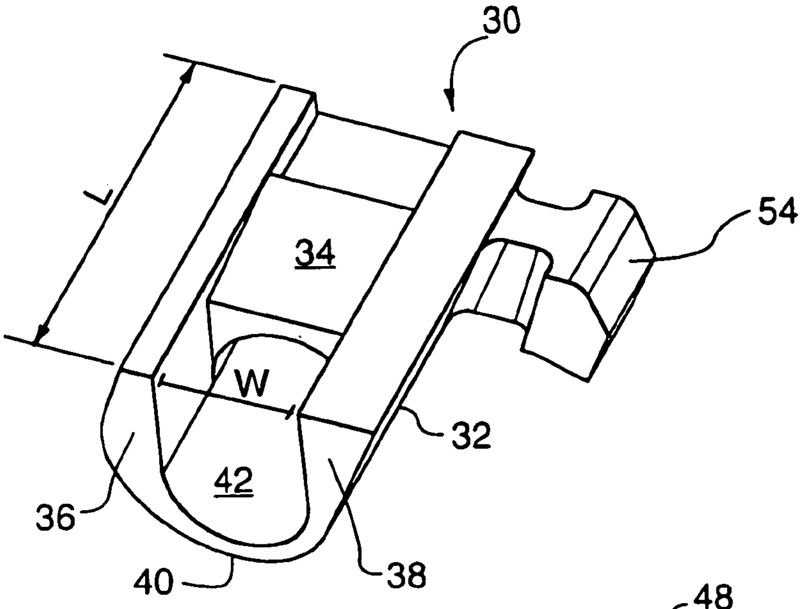
FIG. 2*a* is a schematic diagram of a vibration motor boot.
Figure 2B:
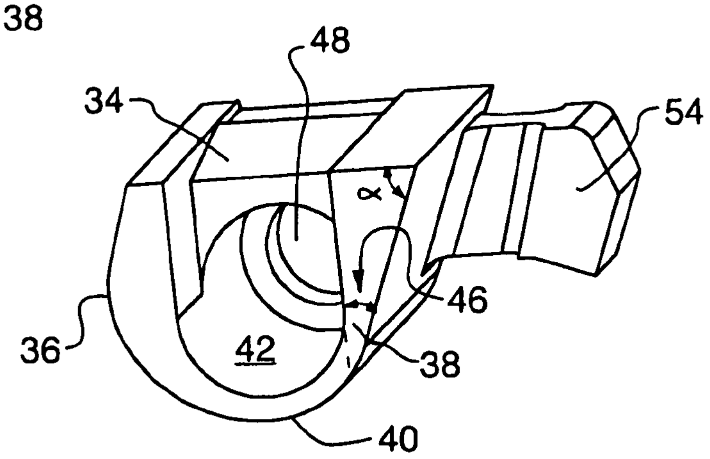
FIG. 2*b* is a schematic diagram of the front of the vibration motor boot.
Figure 2C:
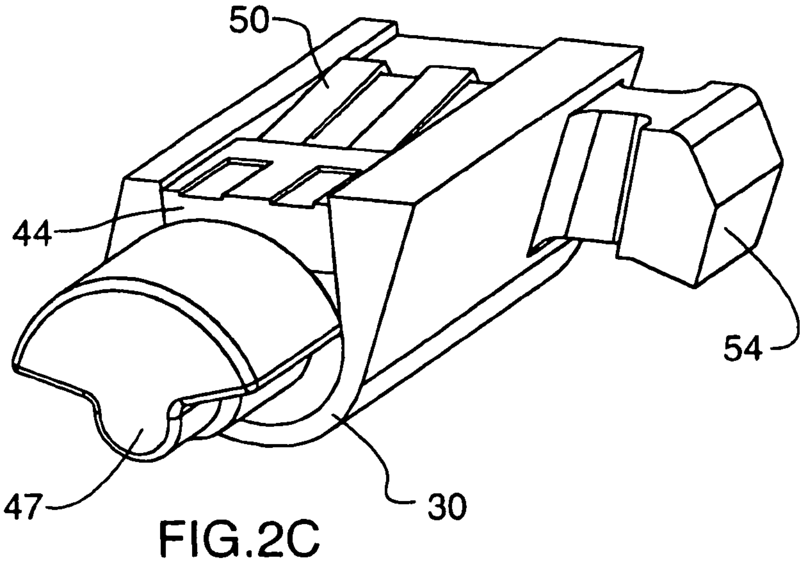
FIG. 2*c* is a schematic diagram of the vibration motor boot housing a vibration motor.

FIGS. 2*a* and 2*b* provide an isometric view and a front view of a vibration motor boot, respectively, while FIG. 2*c* is an isometric view of the vibration motor boot housing a vibration motor.

The vibration motor boot 30 comprises a first surface 32 defining an outer surface of the boot 30, having a top wall 34 connected at one end to a first end of a side wall 36 and at a second end to a first end of a second side wall 38. In this embodiment, the side walls are connected at their second ends to a bottom wall 40 but may also be connected together forming a V-shaped bottom for the outer surface of the boot 30. An angle a between the top wall 34 and the side wall 38 is preferably less than 90°.

The vibration motor boot 30 also comprises a second surface 42 defining an opening which receives a vibration motor 44 (as shown in FIG. 2*c*). This second surface 42 may be seen as a motor receiving slot. In the present embodiment, the second surface 42 is offset axially at an angle 46 from the side wall 38 of the first surface 32. The angle 46 may be between 5° and 60° in order to both provide support to the vibration motor and to simplify the tooling process for the manufacture of the mobile communication device frame or housing within which the vibration motor 44 and vibration motor boot 30 nest.

A length L of the vibration motor boot is selected so that most of the vibration motor 44 rests within the opening defined by the second surface 42 while a width W of the opening is selected so that there is a snug fit between the vibration motor 44 and the second surface 42. Preferably, the only part of the vibration motor 44 which rests outside of the boot 30 is a weight 47 which, when rotated about the motor axis, generates a vibration.

As shown in FIGS. 2*b* and 2*c*, the top wall 34 provides a location whereby contacts 50 of the vibration motor 44 rest. The contacts 50 are located at a normal direction to the vibration motor 44. The position of the top wall 34 is designed to be located perpendicular to the normal of the vibration motor 44 after the vibration motor has been inserted into the opening. The top wall 34 also assists in retaining the vibration motor 44 when the motor is inserted into the vibration motor boot 30.

The vibration motor boot 30 further comprises a rib 54 which assists in supporting a battery within the mobile communication device as will be described below with respect to FIG. 3*b*. The end of the boot 30 near the rib 54 includes a circular opening 48 to receive the end of the vibration motor opposite the weight 47.

Figure 3A:
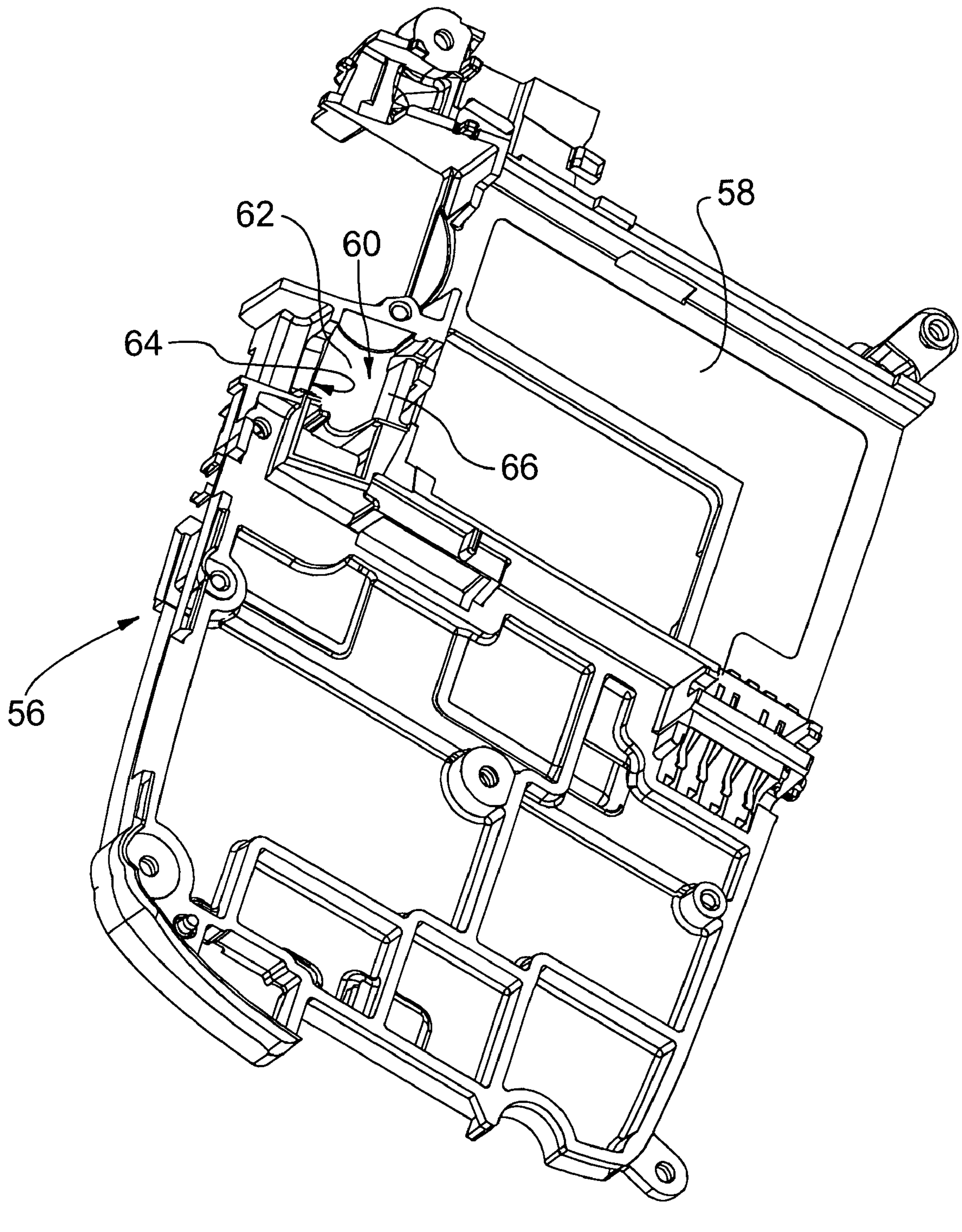
FIG. 3*a* is a schematic diagram of a mobile communication device frame.

A schematic diagram of a mobile communication device frame is shown in FIG. 3*a*. The mobile communication device frame 56 comprises a battery location 58 along with a mounting slot 60, seen as a nest, for receiving the vibration motor boot 30 and the vibration motor 44. The shape of the mounting slot 60 preferably complements the side walls 36 and 38 and the bottom wall 40 of the first surface of the vibration motor boot 30. In this embodiment, the mounting slot 60 comprises a bottom wall 62 along with two side walls 64 and 66. In the present embodiment, part of the bottom wall 62 of the mounting slot 60 is open for housing the weight 47 in order to allow the vibration motor and the weight 47 to vibrate without directly contacting the frame, while fully supporting the vibration motor 44 on the bottom wall 62. The solid part of the bottom wall 62 provides support to the vibration motor boot 30 and the vibration motor 44 when the two are nested into the frame as shown in FIG. 3*b*. As described above, the vibration motor boot 30 is sized to match the mounting slot 60 in order for the vibration motor boot 30 to nest snugly within the mounting slot 60.

Figure 3B:
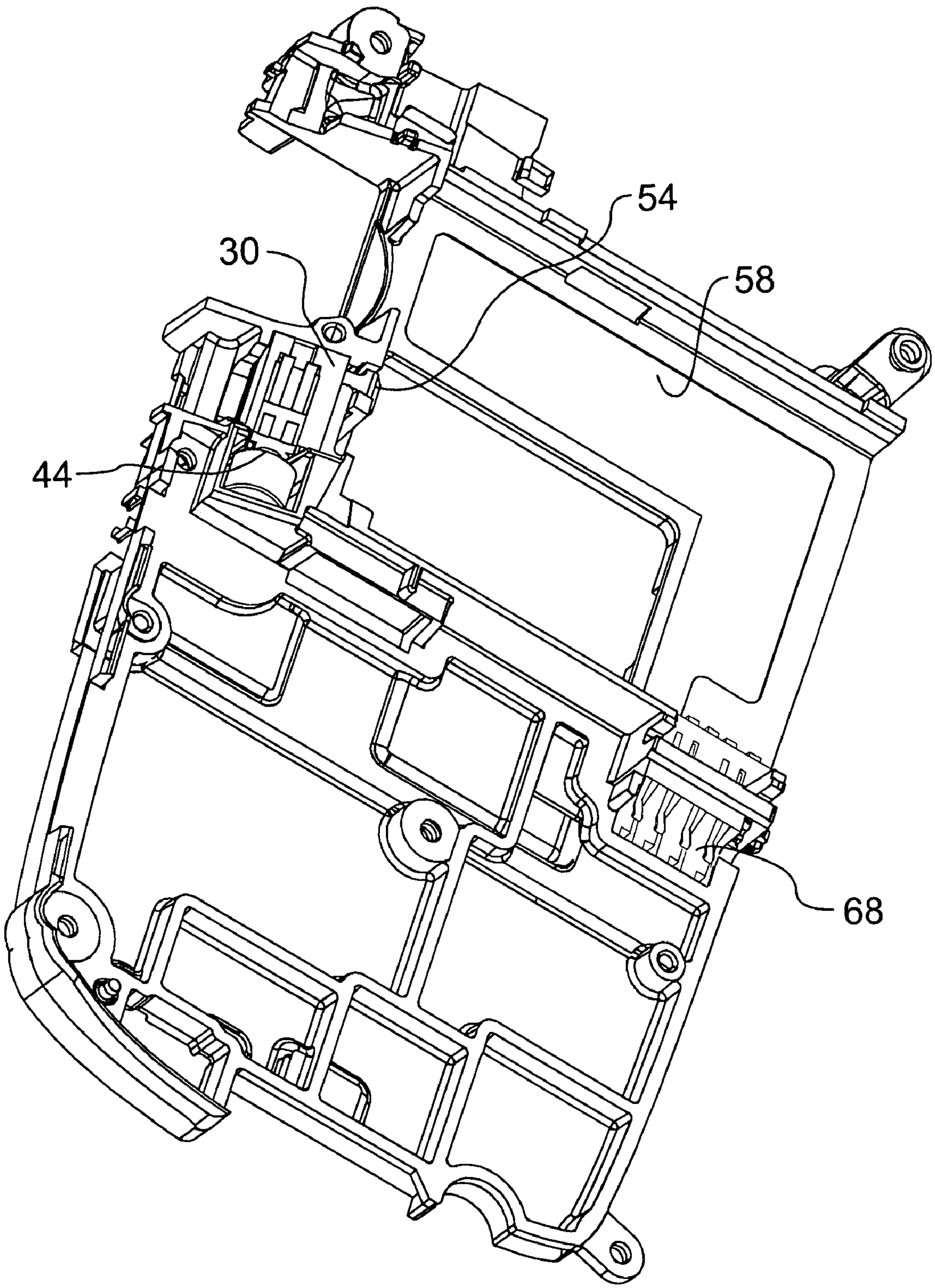
FIG. 3*b* is a schematic diagram of a mobile communication device frame with a vibration motor boot and vibration motor installed.

As further shown in FIG. 3*b*, when the vibration motor boot 30 and the vibration motor 44 are nested into the mounting slot 60, the rib 54 protrudes into the battery location 58 to provide support for the battery, when the battery is installed. Battery contacts 68 are also located within the battery location 58 in order to provide power from the battery to the mobile communication device. The rib 54 biases the battery in the battery location 58 and works with the battery contacts 68 to position the battery and prevent the battery from rattling in the mobile communication device during a period when the motor is generating a vibration.

Figure 4A:
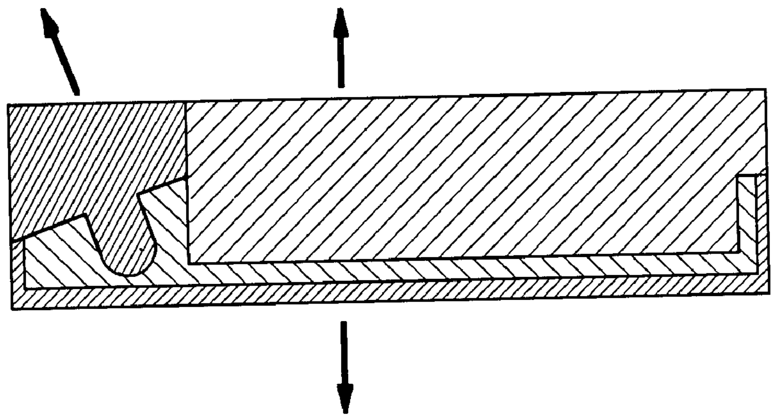
FIG.4A (PRIOR ART)
FIG. 4*a* is a schematic diagram of prior art tooling for manufacturing a mobile communication device frame.
Figure 4B:
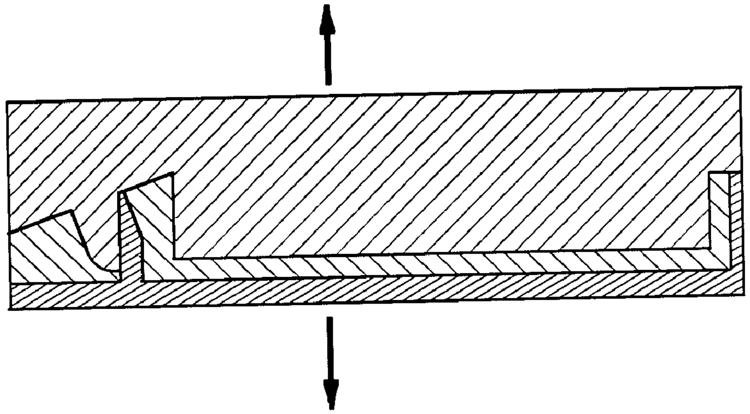
FIG.4B (PRIOR ART)
FIG. 4*b* is a schematic diagram of prior art tooling for manufacturing a mobile communication device frame.

Turning to FIGS. 4*a* and 4*b*, schematic diagrams representing tooling for manufacturing known mobile communication device frames are shown. As can be seen at the top of FIG. 4*a*, a core is comprised of two separate pieces which fit within a cavity. The presence of two separate core pieces causes more time to be spent on removing the core and the cavity, as indicated by the arrows, from the finished frame or housing. This also adds cost and complexity to the required tooling. As shown in FIG. 4*b*, the tooling comprises a single piece core and a single piece cavity. However, due to the angle of prior art vibration boots, there exists a gap at the bottom edge of the location within which the vibration motor boot rests. Since the vibration motor boot is manufactured from a flexible material such as silicone rubber, during installation, the boot may be compressed within the gap which affects operation of the vibration motor. Furthermore, as can been seen in FIGS. 4*a* and 4*b*, the bottom wall of the mounting slot of each of the prior art frames is angled with respect to the base of the frame.

Figure 4C:
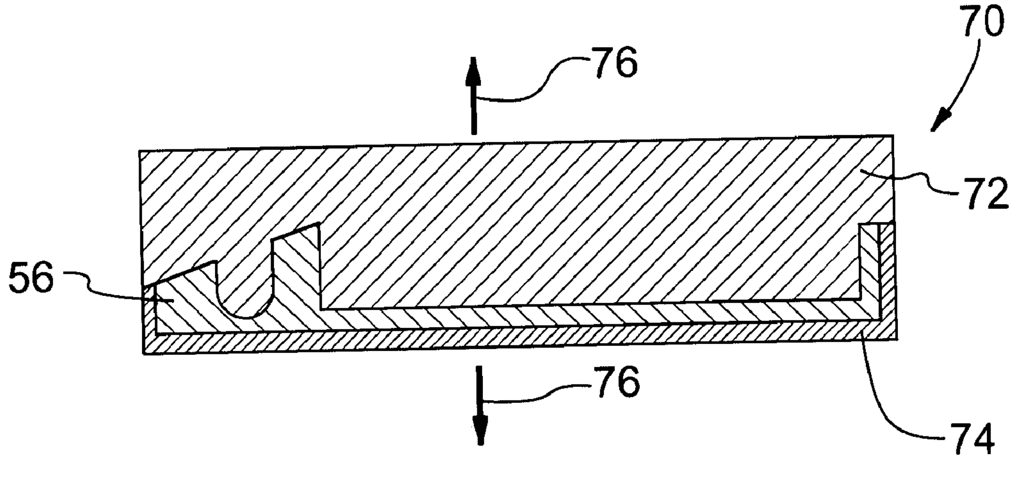
FIG. 4*c* is a schematic diagram of tooling for manufacturing a mobile electronic device frame for use with a vibration motor boot in accordance with an aspect of the present invention.

As shown in FIG. 4*c*, the tooling 70 for manufacturing the mounting slot 60, or nest, in the mobile communication device frame 56 or housing is shown. The tooling 70 comprises a single piece core 72 along with a single piece cavity 74. Manufacturing a vibration motor boot 30 whereby the top wall of the first surface forms a perpendicular surface to the normal of the vibration motor 44, as shown in FIGS. 2*a*, 2*b* and 2*c*), allows for tooling 70 to be created which provides a solid portion in the bottom wall 48 of the mounting slot 60 to support the vibration motor boot 30 after it has been nested into the frame 56. The one-piece core 72 and one-piece cavity 74 also provides other advantages to the manufacturing process of the mobile communication device since less time is required to remove the tooling 70 once the frame 56 has been moulded either via an injection mould or other known manufacturing processes which reduces overall manufacturing time. After their manufacture, the one-piece core 72 and one-piece cavity 74 separate from the mobile communication device fame 56 in a direction as shown by arrows 76.

By causing the top wall of the first surface of the boot 30 to form a perpendicular surface to the normal of the vibration motor 44 (as previously discussed above), the side walls 64 and 66 of the mounting slot 60 are substantially parallel to the direction of the arrows 76 unlike the mounting slots of the prior art which are angled with respect to the direction of the arrows. This allows for the tooling to be more easily separated from the mobile communication device frame. Furthermore, there is also more support at the bottom of the mounting slot for the vibration motor boot and the vibration motor with respect to some mobile communication device frames such as the mobile communication device frame provided by the tooling shown in FIG. 4*b*.

It will be understood that the vibration motor may be used to alert the user of scheduled tasks, a phone call, appointments, or other events, along with or instead of new messages.

Furthermore, it will be understood that although the invention has been described with reference to a mobile communication device, the vibration motor boot may also be implemented in a cell phone or other type of electronic device.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A frame and vibration motor mounting assembly for a mobile communication device comprising:

a frame generally parallel to a reference plane;

a mounting slot in a motor installation surface of said frame, said motor installation surface being angled away from said reference plane, said mounting slot being normal to said reference plane and accordingly angled with respect to said motor installation surface; and a flexible boot positionable in said mounting slot, having an exposed surface generally parallel to said motor installation surface, and having a motor-receiving slot for receiving a vibration motor, said motor-receiving slot having an axis angled between 5° and 60° from an axis of said mounting slot and generally normal with respect to said motor installation surface, whereby said vibration motor is configured to be installed in said motor-receiving slot with an upper surface of said motor, generally parallel to said motor installation surface.

2. The frame and vibration motor assembly of claim 1 wherein said exposed surface of said boot is generally flush with said motor installation surface.

3. The frame and vibration motor assembly of claim 1 wherein said boot further comprises a rib extending from an outer surface of said boot.

4. The frame and vibration motor assembly of claim 1 wherein said boot is detachable from said mounting slot.

* * * * *